(12) United States Patent
Seppa et al.

(10) Patent No.: US 10,673,537 B2
(45) Date of Patent: Jun. 2, 2020

(54) SENSOR AND A SENSOR SYSTEM

(75) Inventors: Heikki Seppa, Vtt (FI); Teuvo Sillanpaa, Vtt (FI); Ville Viikari, Vtt (FI)

(73) Assignee: Teknologian tutkimuskeskus VTT Oy, Espoo (FI)

( * ) Notice: Subject to any disclaimer, the term of this patent is extended or adjusted under 35 U.S.C. 154(b) by 1672 days.

(21) Appl. No.: 13/995,527

(22) PCT Filed: Dec. 7, 2011

(86) PCT No.: PCT/FI2011/051081
§ 371 (c)(1),
(2), (4) Date: Aug. 15, 2013

(87) PCT Pub. No.: WO2012/085333
PCT Pub. Date: Jun. 28, 2012

(65) Prior Publication Data
US 2013/0336095 A1    Dec. 19, 2013

(30) Foreign Application Priority Data
Dec. 20, 2010 (FI) .................... 20106349

(51) Int. Cl.
*B06B 1/02* (2006.01)
*H04B 11/00* (2006.01)
(Continued)

(52) U.S. Cl.
CPC ............ *H04B 11/00* (2013.01); *B06B 1/0292* (2013.01); *G01D 21/00* (2013.01); *G01L 9/0016* (2013.01);
(Continued)

(58) Field of Classification Search
USPC ....... 367/7, 87, 88, 11, 107, 103, 138, 35, 8, 367/99, 104, 140, 15, 16, 173, 18, 95, 89;
(Continued)

(56) References Cited

U.S. PATENT DOCUMENTS

| 543,223 A | 7/1895 | Sinha et al. |
| 6,945,115 B1 | 9/2005 | Wang |

(Continued)

FOREIGN PATENT DOCUMENTS

| WO | WO 2009071746 A1 * | 6/2009 | ............ G01H 9/008 |
| WO | WO2009071746 A1 | 6/2009 | |

OTHER PUBLICATIONS

Viikari (NPL) RFID MEMS sensor concept based on intermodulation 1-13, 15-20 distortion. IEEE Sensors Journal. Dec. 2009, vol. 9, No. 12, pp. 1918-1923.*

(Continued)

*Primary Examiner* — Hovhannes Baghdasaryan
*Assistant Examiner* — Amie M Ndure
(74) *Attorney, Agent, or Firm* — Laine IP Oy

(57) ABSTRACT

The invention relates to a sensor and a system for measuring pressure, variation in sound pressure, a magnetic field, acceleration, vibration, or the composition of a gas. The sensor comprises an ultrasound transmitter, a cavity, and a passive sensor element. In accordance with the invention the sensor includes antenna means for receiving radio frequency signals (f1, f2), and connecting means connecting the antenna to the ultrasound transmitter for using the radio frequency signals for providing energy for driving the ultrasound transmitter.

15 Claims, 8 Drawing Sheets

(51) Int. Cl.
  *G01D 21/00* (2006.01)
  *G01L 9/00* (2006.01)
  *G01L 11/06* (2006.01)
  *G01P 15/08* (2006.01)
  *G01P 15/125* (2006.01)
  *G01L 19/08* (2006.01)

(52) U.S. Cl.
  CPC ............ *G01L 11/06* (2013.01); *G01L 19/086* (2013.01); *G01P 15/0802* (2013.01); *G01P 15/125* (2013.01)

(58) Field of Classification Search
  USPC .... 345/440, 419, 156, 424; 348/81, 148, 47, 348/77, 78; 382/103, 154; 701/21, 2, 3, 701/408, 451, 461, 469
  See application file for complete search history.

(56) References Cited

U.S. PATENT DOCUMENTS

| | | | | |
|---|---|---|---|---|
| 7,596,242 B2* | 9/2009 | Breed | ............... | G06K 9/00362 382/103 |
| 7,769,513 B2* | 8/2010 | Breed | ................ | B60N 2/028 382/151 |
| 2005/0187677 A1* | 8/2005 | Walker | ............... | B64C 13/20 701/16 |
| 2005/0273218 A1* | 12/2005 | Breed | ................ | B60C 11/24 701/2 |
| 2006/0025897 A1 | 2/2006 | Shostak et al. | | |
| 2006/0085160 A1* | 4/2006 | Ouchi | ............... | G01N 21/3581 702/150 |
| 2006/0284839 A1* | 12/2006 | Breed | ............... | B62D 1/046 345/156 |
| 2006/0288789 A1 | 12/2006 | Ullmann | | |
| 2008/0068177 A1* | 3/2008 | Copeland | .......... | G06K 19/0726 340/572.7 |
| 2008/0195261 A1* | 8/2008 | Breed | ............... | B60R 21/0132 701/2 |
| 2009/0092284 A1* | 4/2009 | Breed | ............... | B60J 10/00 382/103 |
| 2009/0141592 A1* | 6/2009 | Huang | .............. | A61B 8/00 367/181 |
| 2009/0167503 A1* | 7/2009 | Cook | ............... | G01L 9/0025 340/10.41 |
| 2010/0275675 A1 | 11/2010 | Seppa et al. | | |

OTHER PUBLICATIONS

Viikari et al: "RFID MEMS sensor concept based on intermodulation distortion". IEEE Sensors Journal. 2009, vol. 9, No. 12, pp. 1918-1923.

EP Application 11850542; filing date Jul. 12, 2011; Teknologian Tutkimushkeshus VTT; European Search Report dated Apr. 7, 2014.

* cited by examiner

SENSOR AND A SENSOR SYSTEM

The present invention relates to a microelectromechanical sensor according to the preamble of Claim 1. The invention also relates to a system according to preamble of claim 8.

BACKGROUND AND THE PRIOR ART

Wireless sensors have a great deal of potential use in numerous applications where a wired readout is difficult, for example, due to harsh operating conditions, rotating parts or cost and complexity of wiring. Wireless sensors are passive, battery-assisted semi-passive, or active containing a radio transmitter and a battery. The advantages of passive sensors are that their life-time or operation conditions are not limited by the battery and that they are inexpensive.

Mostly used passive wireless sensors include radio frequency identification (RFID), surface acoustic wave (SAW) RFID, electrical resonance circuit sensors, and harmonic and intermodulation sensors. RFID is mostly used for identification but will increasingly be used to realize sensors by adding a sensing element to the tag. The highest operation frequency and read-out distance of RFID is limited by the power rectifier that generates power for the IC and they are 5-10 m and a few GHz, respectively. An additional sensor element further increases the power consumption.

SAW RFID tags transform the electromagnetic energy to surface acoustic waves propagating on a piezoelectric substrate. The SAWs are then manipulated and transformed back to electromagnetic waves. The SAW tags lend themselves well as sensors as the propagation properties of SAWs are inherently sensitive to several measured quantities, such as temperature or strain, and no external sensor element is needed. The SAW sensors are reviewed in scientific literature. The highest operation frequency is typically limited to a few GHz by the line width of acoustical reflectors fabricated on the substrate. In addition, the necessity to use a piezoelectric material as the sensing element may limit the number of applications.

Inductively-coupled electrical resonance-circuit sensors are utilized for example to measure strain and moisture. These sensors consist of a simple electrical resonance circuit, whose resonance frequency is sensitive to the measured quantity, but they cannot be read across large distances as they require near-field coupling to the reader device.

Mixer sensors contain a mixing element, such as a diode, and they transmit the sensor data either at a harmonic or intermodulation frequency when illuminated by the reader device. Harmonic radar and tags were first proposed for traffic applications and later were used for tracking insects and avalanche victims. The intermodulation principle was first proposed for telemetry and later was used to implement wireless ferroelectric temperature sensor, proposed for a MEMS sensors based on mechanical mixing, and for automotive radars to detect pedestrians, cyclists and other road users who are in high risk of serious injury in a traffic accident. The advantage of the intermodulation principle over harmonic is the smaller frequency offset, which facilitates the circuit design and compliance with the frequency regulations. Generally, harmonic and intermodulation sensors can provide a very large frequency and read-out distance.

DRAWBACKS OF THE PRIOR ART

MEMS technology has proven to be useful in several sensor applications, such as microphones, inertial and pressure sensors. The advanced MEMS technology cannot nevertheless, yet be used to realize passive wireless sensors in most cases because the existing MEMS sensor elements in most cases require a battery-powered integrated circuit for reading the sensor data. There are several prior art radio solutions that are aiming to solve the problem: zigbee type of radios, Bluetooth and especially RFID sensors. The applicant of this patent, VTT, has previously introduced a sensor for measuring pressure, sound pressure variation, magnetic field, acceleration, shaking, or gas composition, the sensor system comprising at least one ultra sound transmitter having a cavity adjusted in connection with it.

This solution includes a sensor comprising passive sensor element positioned to an opposing end related to cavity, the distance of element from the ultrasound transmitter chosen in a way that the resonance criteria is completed with the frequency used, the ultrasound transmitter comprising a light structured membrane vibrator/oscillator, this way coupling well to the intermediate fluid, and the sensor including means for measuring the interaction between the ultrasound transmitter and the cavity.

The purpose of the invention is to make a wireless ultrasound sensor that provides a way to wirelessly read out a generic MEMS sensor element without an embedded IC-electronics or a power source.

The prior art measures properties of resonance at the utilized frequency, but some embodiments of the technique of invention measures the frequency alteration. The technique of the invention is typically based on modulated back scattering, and it enables high frequency and directivity.

The invented sensor includes antenna means for receiving radio frequency signals, and connecting means coupling the antenna to the ultrasound transmitter. The radio frequency signals provide energy for driving the ultrasound transmitter, and the antenna receives the radio frequency signals $f_1$, $f_2$ and sends radio frequency signals at $f_3$ to the reader.

More specifically, the microelectromechanical sensor according to the invention is characterized by what is stated in the characterizing portion of Claim 1.

More specifically, the system according to the invention is characterized by what is stated in the characterizing portion of Claim 8.

Considerable advantages can be gained with aid of the invention. It enables longer reading distance or alternatively smaller power than the traditional IB-based RFID. This technique can also be much more cost efficient and simpler than IC RFID sensor. The technique can also be combined with CMOS circuit in a way that the MEMS is used as a sensor and a CMOS circuit as power feeding element. The technique has a high potential in medical and well being services, for example in monitoring blood pressure, pulse, respiration, shocks in walking and running and accidental falls. The method enables generic implantable medical sensors, for example for measuring sugar content in blood. It can enable simpler operation for large variety of industrial and medical operations, because it requires less power per reading distance. To summarize, the sensor can offer (cost) efficiency, a long reading distance, it does not require a battery, it has a low power consumption and it can operate in several frequency bands.

The invention is presented with reference to the following figures.

Figure 5A:
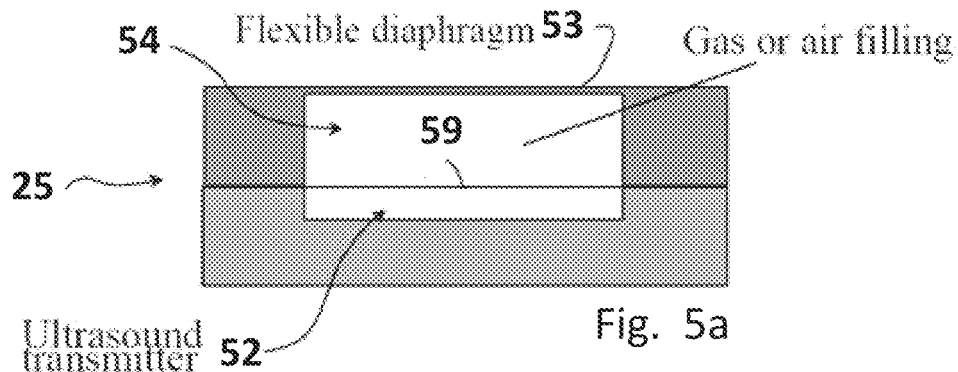
Figure 5B:
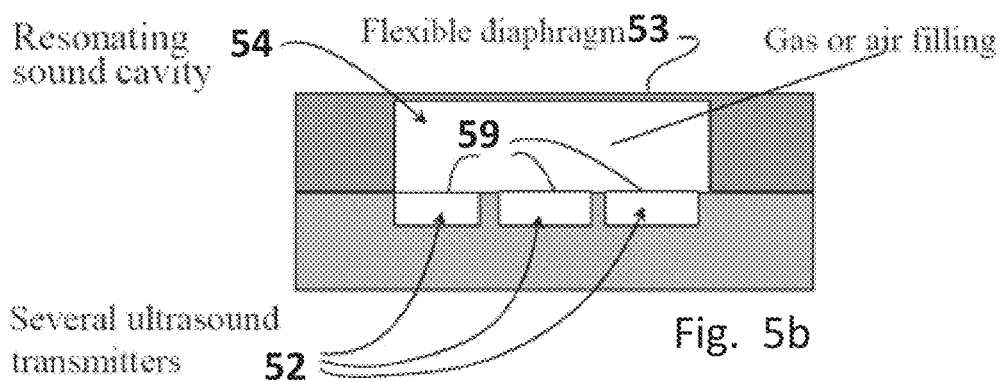
Figure 5C:
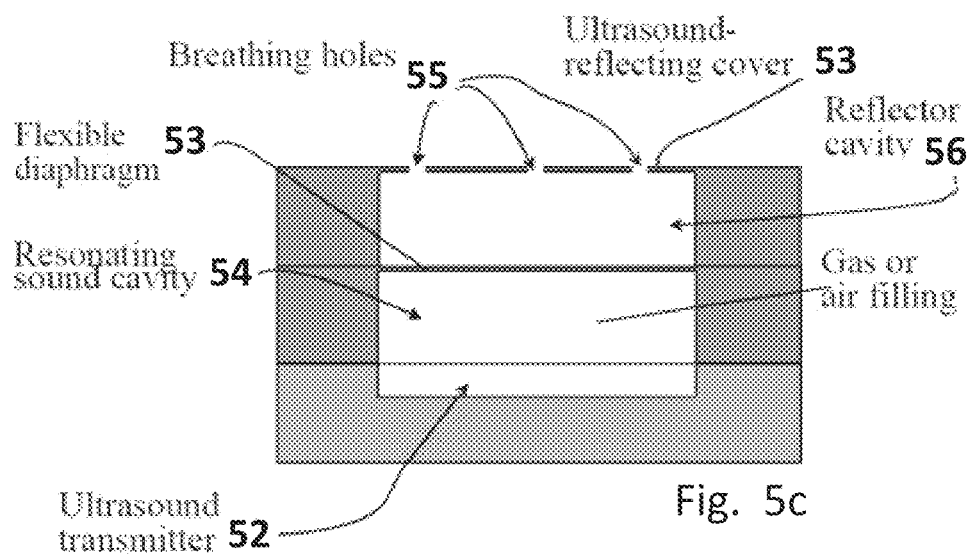

FIGS. 5a, 5b, and 5c present cross-sectional side views of alternative prior art cavity structures usable in sensor according to the invention.

Figure 6A:
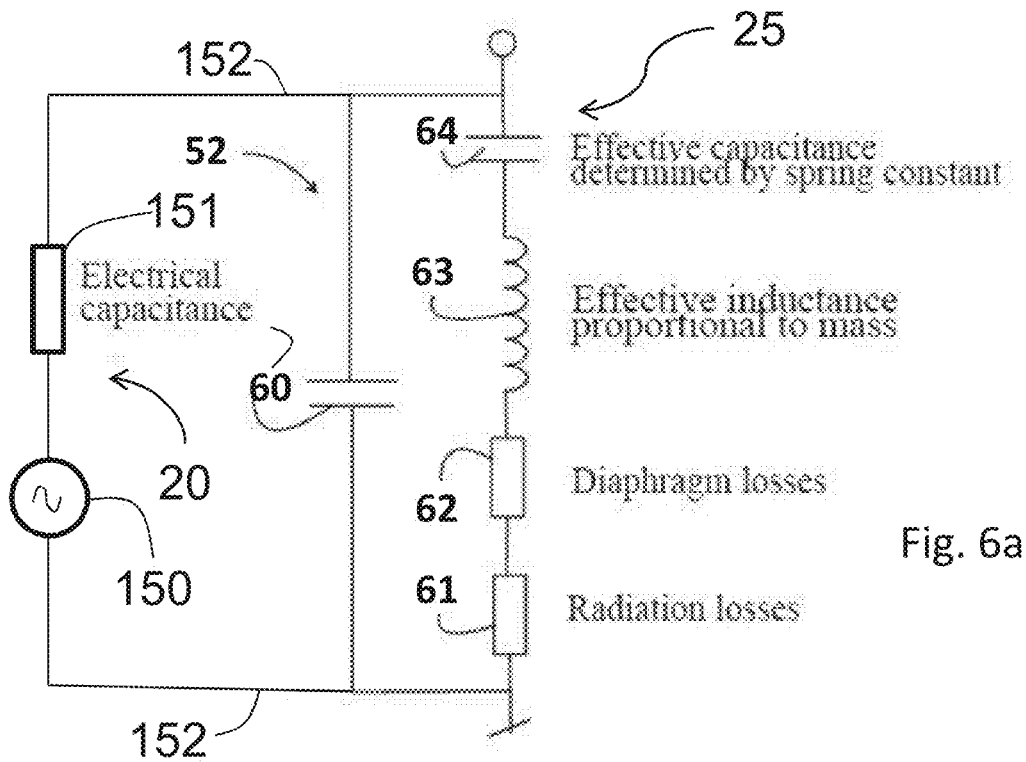
Figure 6B:
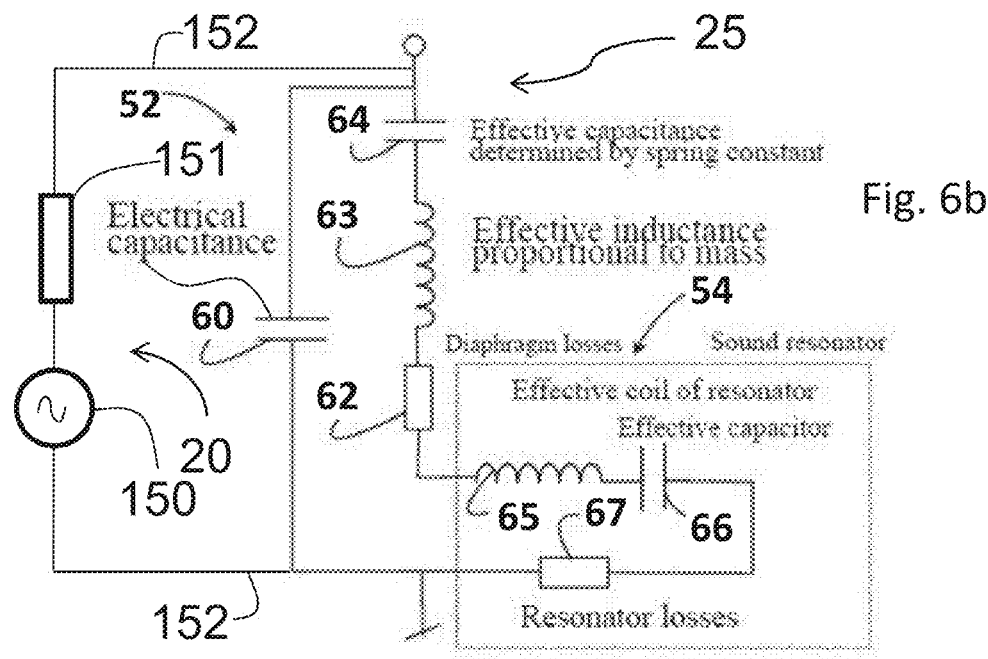

FIGS. 6a and 6b present electrical circuit equivalents of a sensor in accordance with the invention.

Figure 7A:
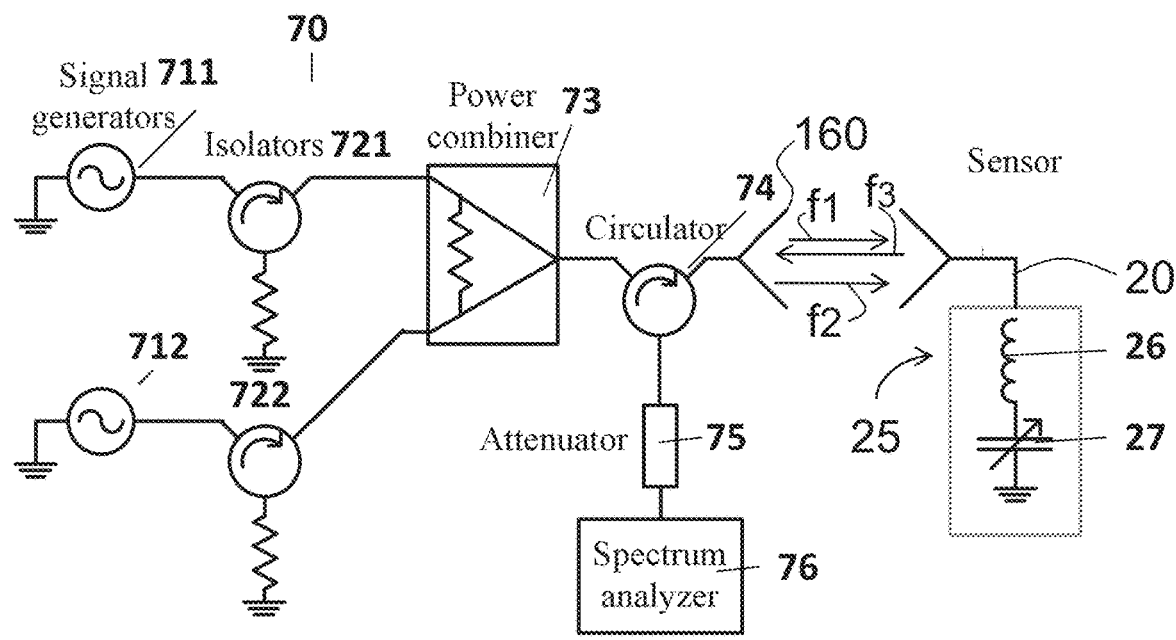
Figure 7B:
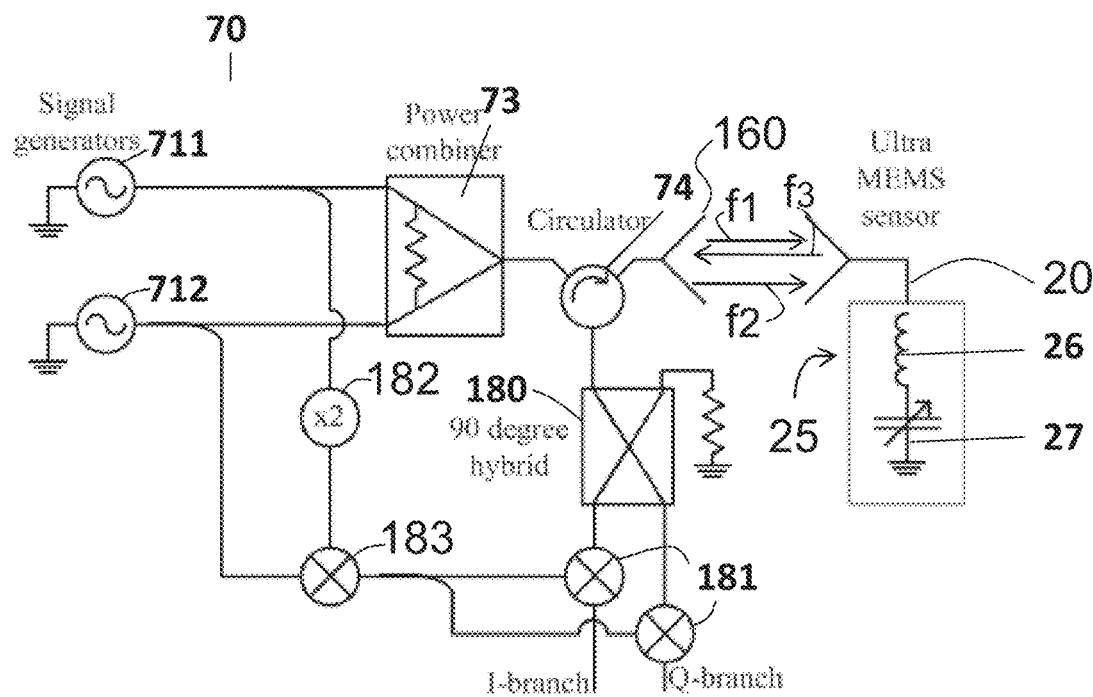

FIGS. 7a and 7b present possible read-out systems in accordance with the invention.

Figure 8:
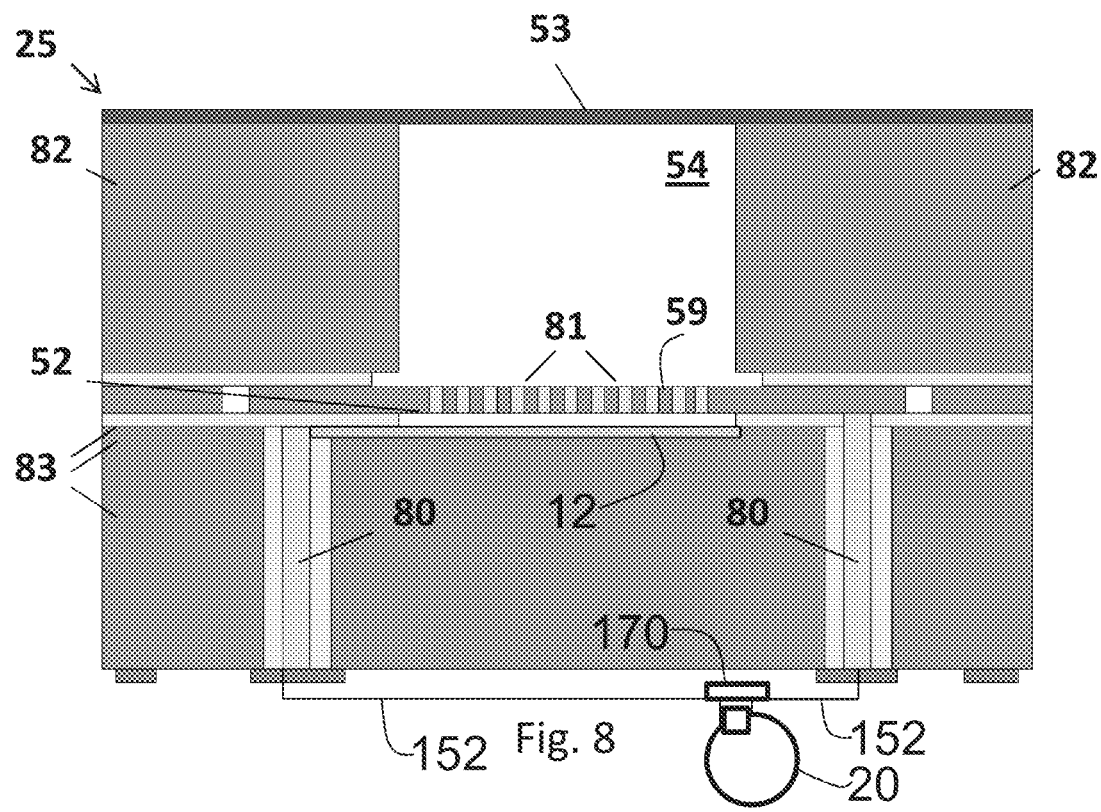

FIG. 8 presents a cross sectional side view of a sensor usable in a sensor system according to the invention.

Figure 9:
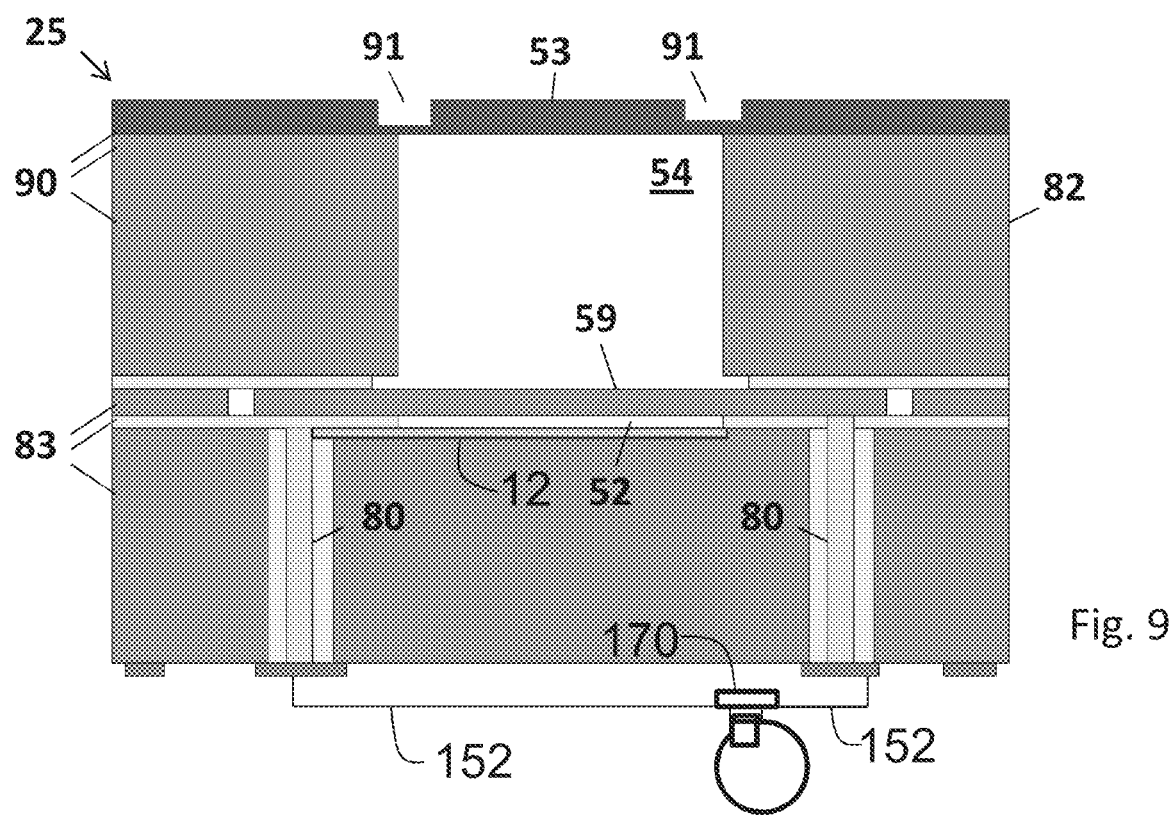

FIG. 9 presents a cross sectional side view of an alternative structure usable in a sensor end according to the invention.

Figure 10:
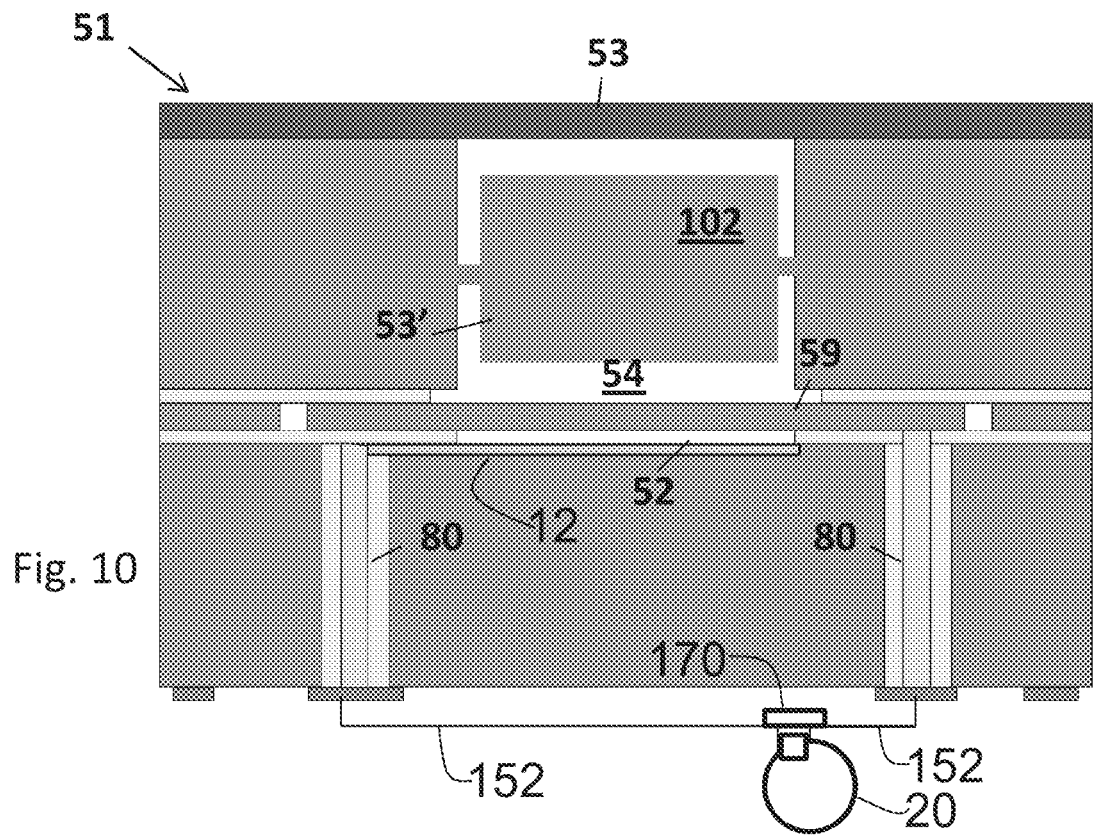

FIG. 10 presents a cross sectional side view of an acceleration sensor usable in a sensor end according to the invention.

Figure 11:
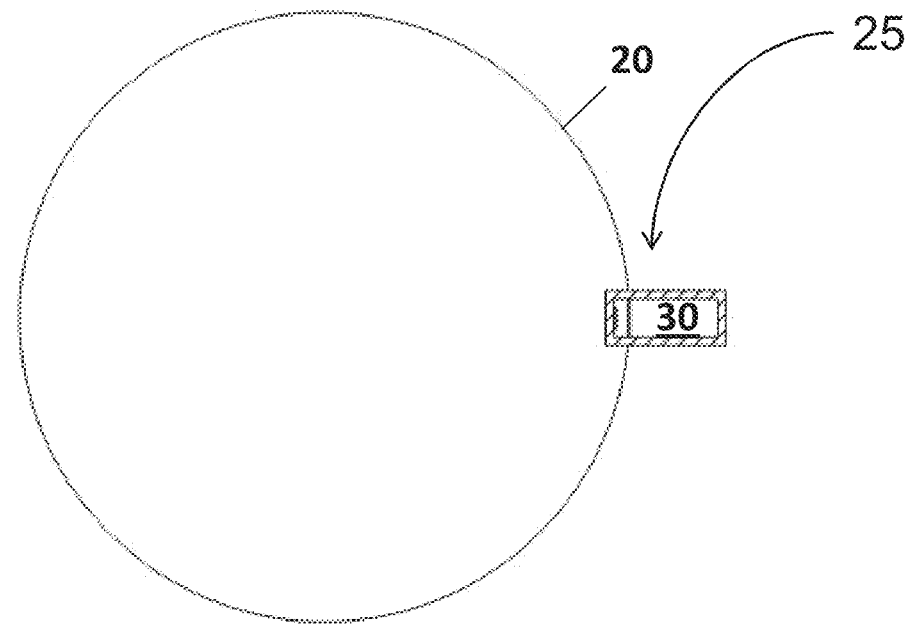

FIG. 11 presents a possible antenna configuration for a wireless ultra MEMS sensor according to the invention.

Figure 12:
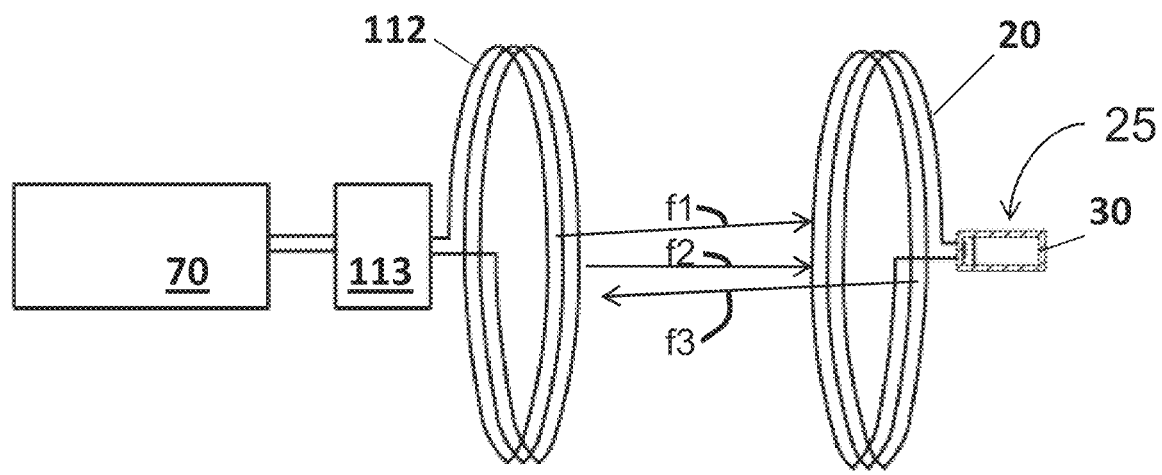

FIG. 12 presents a sensor system with an inductive coupling for read-out in accordance with the invention.

The following terms with reference numbers will be used in the following description of the invention:
10 support
11 Zm, mechanical impedance of the electrode
12 fixed electrode, bottom electrode
13 movable electrode, top electrode
14 area A of the fixed electrode 12
15 $\varepsilon_0$, the permittivity of vacuum 16
16 gap height $g_0$
17 electrostatic force $F_e$
18 Voltage $V_c$ across the electrodes 13 and 12
20 antenna
21 equivalent voltage generator of the antenna 20
22 equivalent serial resistance of the antenna 20
23 equivalent serial inductance of the antenna
24 MEMS resonator
25 sensor structure in accordance with the invention including antenna 20 and MEMS resonator 24
26 equivalent serial resistance of the MEMS resonator 24
27 equivalent serial capacitance of the MEMS resonator 24
30 acoustic fluid-filled cavity resonator
31 ultrasound transducer/ultrasound transmitter
35 surface area of the cavity (pipe)
36 length of the cavity
37 density of air
38 speed of sound
41 first length of the cavity 54
42 second length of the cavity 54
43 third length of the cavity 54
51 acceleration sensor
52 ultrasound transmitter
53 flexible diaphragm, passive sensor element
54 resonating sound cavity
55 breathing holes of the cavity 54
59 movable electrode of the ultrasound transmitter 52 or 31, typically polysilicon
61 radiation losses of diaphragm 59
62 losses of diaphragm 59
63 mass of the membrane 59
64 capacitance of spring constant of membrane 59
65 effective coil of resonator 54
66 effective capacitance of the resonator
67 effective resonator losses
70 reading electronics
73 power combiner
74 circulator
75 attenutor
76 spectrum analyzer
80 conductors
81 holes
82 silicon structure
91 thinning grooves
90 disc
102 mass
112 reader coil/reader antenna
113 matching circuit
150 equivalent voltage generator of the antenna 20
151 equivalent voltage generator of the antenna 20
152 conductors of the antenna 20
160 antenna
170 matching circuit
180 90 degree hybrid
181 multiplier
182 frequency doubler
183 multiplier
711 first signal generator
712 second signal generator
721 first isolator
722 second isolator Referring to the figures is presented the usage of MEMS ultrasound sensor for measuring cavity dimensions, speed of sound and attenuation of sound and variables logically following one of these or some combination of them. It is generally known that the impedance of an ultrasound transmitter is dependent on deflections, but for example in the case of a piezoactive transmitter the impedance is very high and the coupling to the cavity low. The utility ratio of an ultrasound MEMS is very good enabling low power wireless sensors.

Here presented UltraMEMS is a generic way to make similar sensors as with MEMS in general as described e.g. in EP08856883. A difference between typical prior art capacitive and the present invention sensor is that the capacitive MEMS transforms the measured variable to change of membrane position and thus capacitance whereas the present invention (UltraMEMS) transforms variable to a change in a resonance frequency of a MEMS ultrasound transmitter. A wireless sensor can be made with UltraMEMS by feeding two high frequency signals at $f_1$ and f2 to MEMS component and detecting the frequency of MEMS resonance and attenuation (inversely proportional to Q value) by using the sidebands of backwards reflected signal at f3. By combining UltraMEMS and wireless MEMS we can make a generic platform for very many wireless sensors.

In the following a couple of examples are presented: a completely passive one component (+antenna) pressure sensor is installed in a car tyre. When a high read-out frequency is used the antenna can be small. Other example is installing to vain a pressure sensor, which is read by wrist computer. If the vain is close to the surface and the reading device operates at very high frequency (3-10 GHz) we can even integrate the antenna to the UltraMEMS component. Generally the applications are medical applications, well being sensors, transportation means, industrial applications and possibly mobile terminal related sensors (even wireless passive microphone).

The arrangement according to figures forms sensor system for measuring pressure, sound pressure variation, magnetic field, acceleration, shaking, or gas composition, the sensor system comprising sensor end comprising at least one sensor and analysis end comprising at least one ultrasound transceiver, the at least one sensor having a wireless ultrasound resonance frequency.

In the sensor system the at least one sensor is microelectromechanical MEMS sensor adjusted to transform place alteration in the sensor end to sensor ultrasound resonance frequency alteration, and the analysis end comprising means for notifying the altered sensor ultrasound resonance frequency by means 70 for transmitting wireless ultrasound frequency altering the transmitted wireless ultrasound (difference) frequency until the altered (difference) frequency resonates with the altered resonance frequency of the at least one sensor.

Idea is that the analysis side comprises means for notifying the pressure, sound pressure variation, magnetic field, acceleration, shaking or gas composition from the alteration of resonance frequency. At least one sensor comprises cavity 54 which is adjusted to alter its shape in relation to place alteration to be transformed, and that is in resonance mode in the altered resonance frequency. Sensor system is adjusted to derive and notify at least one secondary variable, preferably pressure, sound pressure variation, magnetic field, acceleration, shaking or gas composition from at least one notified variable, preferably altered resonance frequency.

In order to find the altered resonance frequency sensor system includes means for feeding in two high frequency signals to the at least one microelectromechanical sensor 25. On the other hand in order to measure the secondary variable of interest it includes means for transforming the variable to be measured through place alteration to transmitted ultrasound frequency $f_3$ to be received at the analysis side 70.

In order to have some use for received frequency in the analysis side it comprises means for detecting the MEMS resonance frequency $f_3$ and preferably Q value. The means for detecting the Q value are preferably adjusted to detect a response to capacitive nonlinearity of back scattered signal and/or detect a response to the sidebands of back scattered signal or response by taking into account the sidebands of back scattered signal.

A sensor system according to the invention can be made on a integrated platform that combines microelectronic ultrasound transducers and cavity sensors, UltraMEMS and wireless MEMS. Practically a sensor system according to the invention can, for example, be arranged in a way that the analysis end includes a reading device adjusted to generate two frequencies frequency difference of which is adjustable 73 to join/match the resonance frequency of the at least one MEMS sensor 79 in the sensor end. The reading device 70 can include a detector adjusted to amplify signal coming through circulator and adjusted to be led to mixer (attenuator). The sidebands of the back scattered signal can be adjusted to be eliminated or made milder by electrical filters and/or by active carrier compensation.

In the sensor system according to the figures at least one sensor of it is an integrated microelectromechanical ultrasound transducer combined with microelectronic cavity. In some applications the system can comprise a generic and or integrated platform for plurality of wireless sensors. A sensor according to figures can be configured to be used to measure gas concentration, magnetic field, pressure, acceleration or distance. It can be configured to be used as a microphone. It is preferably adjusted to operate in the sensor side of the sensor system according to the figures and adjusted to alter a place variable to a frequency variable and transmit at its wireless ultrasound resonance frequency. It is adjusted to alter its transmitted ultrasound resonance frequency in relation to place variable 33 alteration it is adjusted to sense.

It can include a passive sensor element 53, 53', which is positioned to opposing end related to ultrasound transmitter 2 the distance of which to ultrasound transmitter 52 is dimensioned to meet the resonance criteria. Then the ultrasound transmitter comprises light structured membrane vibrator 59, which thus well couples to surrounding material, and the sensor includes means for measuring the interaction between the ultrasound transmitter 52 and the cavity 54.

According to the FIGS. 11 and 12 is also presented a device for measuring pressure, pressure variation, magnetic field, acceleration, vibration and gas composition, the measuring being performed by measuring based on micromechanical ultrasound and microcavity. It includes frequency generation means, frequency detection means, and the frequency generation means are adjusted to generate two frequencies frequency difference of which is adjustable to join a resonance frequency of sensor end. The device preferably includes a circulator and a mixer, and the signal to be detected is adjusted to come through circulator and led to mixer.

The device preferably includes means for eliminating, or making milder, sidebands, generated by receiver because of nonlinearity, by active carrier compensation and/or by electrical filters.

This document presents a general passive wireless MEMS sensor concept according to the invention. The sensor consists of an electrostatic MEMS ultrasound transducer 31 directly matched to an antenna 20 and loaded with an acoustical resonator 25 which acts as a sensor element. The sensor 20 uses the intermodulation communication principle and it can potentially provide a large frequency and read-out distance. The concept allows the use of generic MEMS sensor elements 25 and can thus be used to monitor numerous measurement quantities. Potential applications of the sensor 25 could include wireless monitoring of car tire pressure, moisture inside building structures, and strain in bridges. Ultimately, the concept could enable very small implantable health monitoring sensors.

Figure 1:
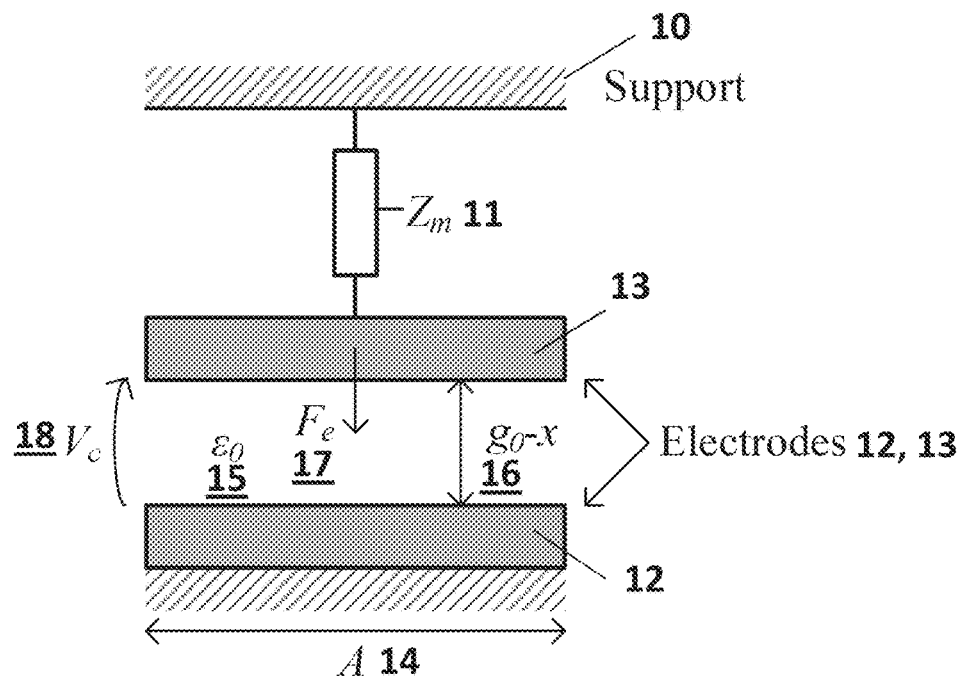
FIG. 1 shows an equivalent mechanical model of an electrostatically-actuated MEMS resonator according to the invention.

Electromechanical Response of the MEMS Resonator is Analyzed in Accordance with FIG. 1:

Let us consider an air-filled parallel-plate capacitor with a surface area of A 14 and initial gap height of $g_0$ 16. The bottom electrode 12 is fixed and the top electrode 13 is connected to a support 10 with a spring 11 such that its mechanical impedance is $Z_m$, as shown in the schematic layout of electrostatically-actuated MEMS resonator.

The movement of the top electrode from its initial position for harmonic excitation force $F_\omega$ is given as $$x = \frac{F_\omega}{j\omega Z_m}, \quad (1)$$

where $\omega$ is the angular frequency of the force. Voltage $V_c$ 18 is applied across the electrodes and it creates an electrical force 17 of $$F_e = \frac{\varepsilon_0 A V_c^2}{2(g_0 - x)^2} \approx \frac{C_0}{2g_0} V_c^2, \quad (2)$$

where $g_0$ 15 is the permittivity of vacuum and $C_0=\varepsilon_0 A/g_0$ is the initial capacitance. Small movement is assumed in the approximation. The MEMS capacitor (resonator in the picture) 24 is matched to an antenna 20, as shown in the electrical equivalent circuit of FIG. 2.

The antenna 20 is illuminated with two frequencies $f_1$ an $f_2$ and it produces a voltage 21 of $$V_a \sqrt{P_{in} R_a} (\sin \omega_1 t + \sin \omega_2 t),$$

where $P_{in}$ is the total received power at both frequencies, $R_a$ is the antenna 20 resistance 22, and $\omega_1$ and $\omega_2$ are the angular frequencies of the sinusoids. Assuming that the relative frequency difference between sinusoids is much smaller than the electrical bandwidth of the system ($\omega_2-\omega_1 \ll \omega^2 C_0(R_a+R_c)$), i.e., $\omega_1 \approx \omega_2 \approx \omega_{RF}$, the voltage across the MEMS capacitance is given as $$V_c = \frac{V_a}{j\omega_{RF} C_0(R_a + R_c + j\omega L + 1/(j\omega C_0))} = \frac{V_a}{j\omega_{RF} C_0 Z_e}, \quad (4)$$

where $C_0$ is the initial, later adjustable capacitance 27, C, of the capacitor 24, 26, $R_c$ is the series resistance of the capacitor 24. L, 23 is the series inductance, and $Z_e = R_a + R_c + j\omega L + 1/(j\omega C_0)$ is the electrical impedance of the circuit. Substituting (3) and (4) into (2) gives the electrical force 17 affecting the top electrode 13:

$$F_e = -\frac{C_0 P_{in} R_a}{2 g_0 \omega_{RF}^2 C_0^2 Z_e^2} \cdot \left(1 + \cos((\omega_2 - \omega_1)t) + \cos((\omega_2 + \omega_1)t) - \frac{1}{2}\cos(2\omega_1 t) - \frac{1}{2}\cos(2\omega_2 t)\right), \quad (3)$$

Let us assume that the force components at frequencies $\omega_1+\omega_2$, $2\omega_1$, and $2\omega_2$ are much greater than the mechanical resonance frequency of the resonator and do not actuate the electrode. Further neglecting the DC-force term that cause a small static gap change, the mechanical vibration (amplitude x) 16 of the resonator is given as $$x = -\frac{C_0 P_{in} R_a}{j\omega_\Delta Z_m 2 g_0 \omega_{RF}^2 C_0^2 Z_e^2} \cos \omega_\Delta t, \quad (5)$$

where $\omega_\Delta = \omega_2 - \omega_1$.

Figure 2:
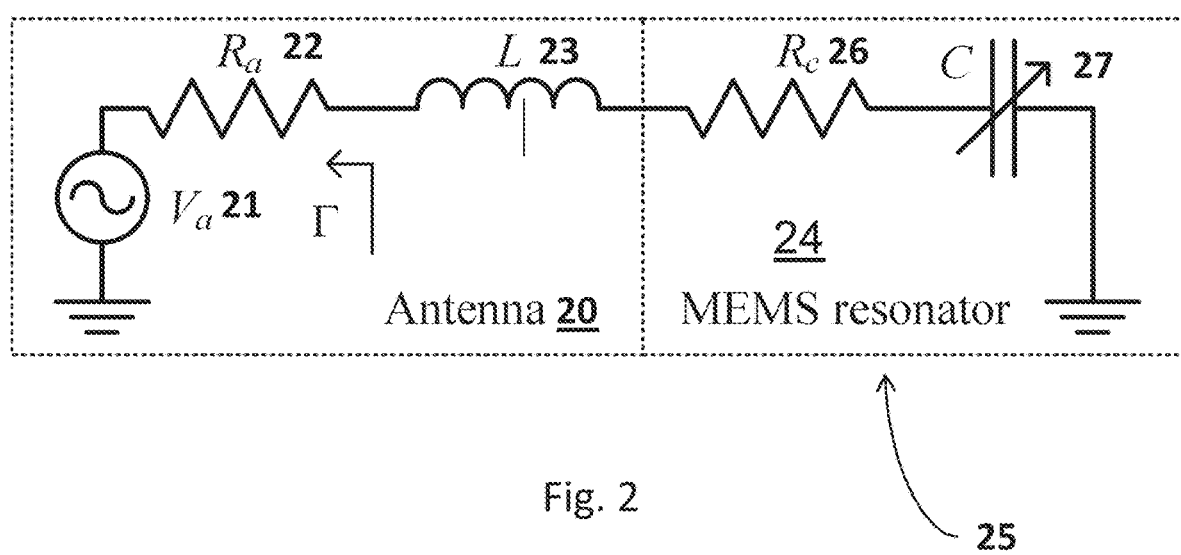
FIG. 2 shows an electrical equivalent circuit of a MEMS resonator matched to an antenna according to the invention.

Intermodulation Response of the MEMS Sensor:

The mechanical oscillation of the capacitor plate causes modulated backscattering of microwaves. When relative movement of the capacitor plate is small, the modulated voltage across the antenna resistance shown in FIG. 2 is given as $$V_a \Delta \Gamma = -\frac{V_a}{j\omega_{RF} C_0 Z_e} \cdot \frac{x}{g_0}. \quad (6)$$

The voltage at intermodulation frequencies is obtained by substituting (5) and (3) into (6):

$$V_{a,IM} = -\frac{P_{in}^{3/2} R_a^{3/2}}{4\omega_\Delta Z_m g_0^2 \omega_{RF}^3 C_0^2 Z_e^3} \cdot (\sin((2\omega_1 - \omega_2)t) + \sin((2\omega_2 - \omega_1)t)). \quad (7)$$

The radiated power at one intermodulation frequency is given as $$P_{IM} = \frac{P_{in}^3 R_a^2}{32\omega_\Delta^2 Z_m^2 g_0^4 \omega_{RF}^6 C_0^4 Z_e^6}. \quad (8)$$

Figure 3:
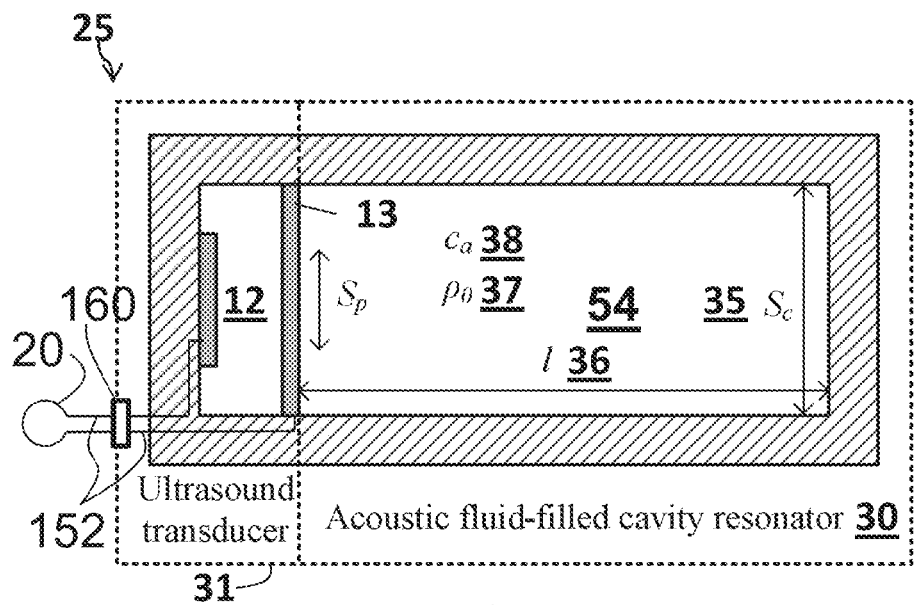
FIG. 3 shows a schematic layout of an ultrasound-based passive wireless MEMS sensor according to the invention.

An Ultrasound-Based Passive Wireless MEMS Sensor according to the invention referring to FIG. 3 is studied in the following:

A proposed sensor 25 consists of an electrostatically-actuated MEMS ultrasound transducer 31 that is matched typically by a matching circuit 160 to an antenna 20. The aim of the matching circuit is to match the impedance of the sensor 25 to the antenna 20. The ultrasound transducer 31 is loaded with an acoustical resonance structure 54, whose acoustic impedance is sensitive to the measured physical quantity. The acoustic impedance 11 (FIG. 1) of the resonator is wirelessly measured with the intermodulation readout principle, in which the sensor 25 replies its sensor data at an intermodulation frequency $f_3$ when the reader device (FIG. 7) illuminates it with two closely located frequencies $f_1$ and $f_2$. The following analysis relates the acoustic impedance to the intermodulation response of the sensor. Note that simple acoustic and resonance circuits are used in the following analysis for simplicity, but the same theory applies for arbitrary electrical and acoustic resonator structures.

Mechanical Impedance of the MEMS Resonator Loaded with Fluid-Filled cavity 54 is studied in the following:

Let us consider a capacitive micromachined ultrasonic transducer (CMUT) consisting of a sealed cavity between two parallel capacitor plates 12 and 13, from which one 12 is fixed and the other 13 is a flexing membrane 13. The CMUT is loaded with a fluid-filled cavity 54 (pipe), as shown in the FIG. 3. The FIG. 3 presents schematic layout of ultrasound-based passive wireless MEMS sensor. An electrostatically actuated ultrasound transducer 31 is loaded with an acoustical fluid-filled cavity resonator 54.

Let us consider the membrane 13 as a flat piston, whose effective surface area is $S_p$. The loaded mechanical impedance (force/velocity) of the piston is a sum of its unloaded mechanical impedance and acoustic radiation impedance of the acoustic resonator:

$$Z_m = Z_p + Z_a = b_p + j\left(m_p \omega - \frac{k_p}{\omega}\right) + Z_a, \quad (9)$$

where $b_p$ is the friction of the piston, $m_p$ and $k_p$ are the effective mass and spring constant of the piston, $\omega = 2\pi f$ is the angular frequency, and $Z_a$ is the acoustic radiation resistance. When the acoustic resonator is a fluid-filled cavity 54 (pipe) terminated with infinite impedance (fixed end), its radiation impedance is given as $$Z_a = \frac{S_p^2 \rho_0 c_a}{S_c \tanh(\gamma l)}, \quad (10)$$

where $\rho_0$, 37 is the density of the fluid, $C_a$, 38 is the longitudinal speed of sound in the fluid, $S_c$, 35 is the surface area of the pipe, l, 36 is the length of the cavity 54 (pipe), and $\gamma = j\beta + \alpha$ is the complex propagation constant of the sound. The phase constant is given as $\beta = \omega/c_a$ and the attenuation constant depends on the absorption of the acoustic signal. When the absorption is dominated by the viscous losses in the cavity 54 (pipe), the attenuation constant for cylindrical cavity 54 is given as $$\alpha = \frac{1}{ac_a}\sqrt{\frac{\eta\omega}{2\rho_0}}, \quad (11)$$

where a is the radius of the pipe and η is the shear coefficient of viscosity.

Calculations:

This section estimates the feasibility of the concept by calculations. The estimated parameters of the transducer are shown in Table I. The transducer 31 is loaded with an air-filled cavity 54. The sensor is interrogated at 10 MHz RF frequency with 20 dBm power.

TABLE I

THE ESTIMATED PARAMETERS OF ULTRASONIC TRANSDUCERS AND ACOUSTIC RESONATOR.

| Parameter | Value |
| --- | --- |
| Transducer surface area | 1 mm$^2$ |
| Fill factor | 70% |
| Effective surface area 14 | A = 0.7 mm$^2$ |
| Membrane thickness | t = 1 μm |
| Density of silicon | ρ = 2329 kg/m$^3$ |
| Effective mass | $m_p$ = 0.5 · Atρ = 0.815 μg |
| Resonance frequency | $\omega_{res}$ = 1.4 MHz |
| Spring constant | k = $\omega_{res}^2$m = 63000 N/m |
| Mechanical quality factor | Q = 10000 |
| Friction | b = √km|Q = 1.14 · 10$^{-7}$ Ns/m |
| Effective piston area | $S_p$ = 0.5 A = 0.35 mm$^2$ |
| Gap | $g_0$ = 1 μm |
| Vacuum permittivity | $\varepsilon_0$ = 8.854 · 10$^{-12}$ F/m |
| Capacitance | $C_0$ = $\varepsilon_0 S_p/g_0$ = 3.1 pF |
| Electrical resonance frequency | $\omega_{RF}$ = 10 MHz |
| Matching inductor | L = 84 μH |
| Electrical quality factor | 10 |
| Capacitance resistance | $R_c$ = 530 Ω |
| Antenna resistance | $R_a$ = 530 Ω |
| Density of air 37 | $\rho_0$ = 1.2 kg/m$^3$ |
| Speed of sound 38 | $c_a$ = 340 m/s |
| Shear coefficient of viscosity | η = 1.78 · 10$^{-5}$ kg/(ms) |
| cavity (pipe) radius | a = 1 mm |
| Cavity (Pipe) length | l = 0.12 mm |

Figure 4:
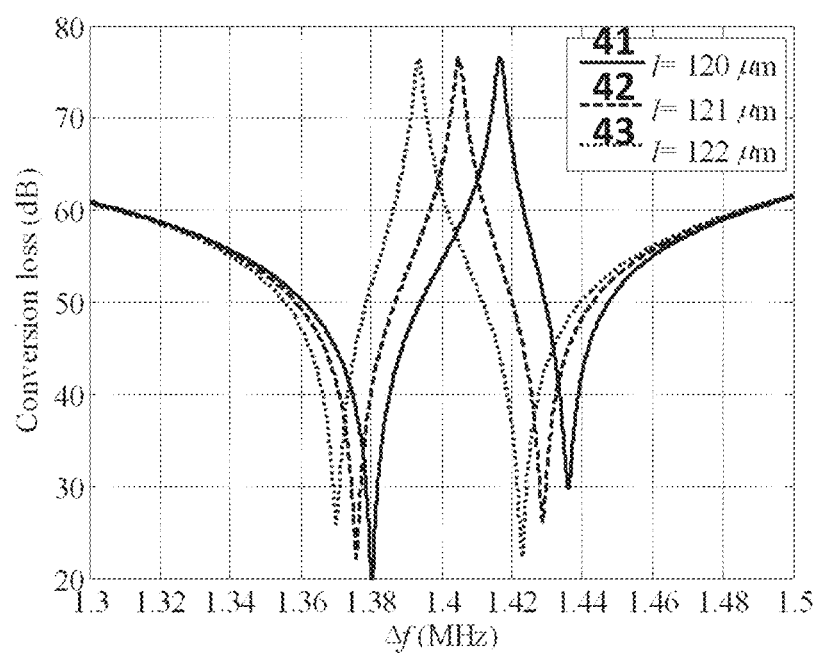
FIG. 4 shows a calculated conversion loss ($P_{in}/P_{IM}$) for different cavity lengths as a function of the frequency difference.

The calculated intermodulation response of the sensor 25 as a function of the frequency is shown in the FIG. 4. Different lines are for different cavity 54 (pipe) lengths. The FIG. 4 presents the calculated conversion loss ($P_{in}/P_{IM}$) after (8) for different cavity lengths as a function of the frequency difference and shows that the concept allows to measure very small changes in the cavity length, or changes in speed of sound in the fluid. The resonance frequency is different in different cavity 54 (pipe) lengths 41, 42, 43 as can be seen from FIG. 4.

The FIG. 5a and the FIG. 5b show principle structure of an ultra sound sensor 51 utilized in sensor system according to the invention. The FIG. 5a presents a structure where ultrasound transmitter 52 is formed by a single cavity, and the FIG. 5b presents a situation where the sound is created by a plurality of parallel vibrating transmitters 52. The membrane 59 of transmitter 52 generates a resonating ultrasound resonance to the cavity 54. An ultrasound sensor 52 creates both resonances—serial and parallel. The impedance of serial resonance is typically from 1 to 10 kOhm and the impedance of the parallel resonance 10-100 times greater always according to the quality factor of the resonator. We assume here that a flexible upper membrane 53 reflects the majority of the sound back and only a small portion radiates out behind the membrane 53. In practice this means that the impedance of the serial resonance is reduced. If the membrane radiates power out, the quality factor of the cavity gets smaller and the resolution gets weaker. The FIG. 5c presents an arrangement where an additional cavity 56 sized half of the wavelength is added above the cavity, the top 53 of which is preferably thick and inflexible efficiently reflecting wave of ultrasound back to the cavity 54.

The ultrasound sensors presented in FIGS. 5a and 5b can be based on SOI disc, which silicon oxide structure is locally sacrificed through the wholes made to the disc by RIE etching. The wholes are in the end filled with polysilicon. The cavity is in a void in order to determine the losses of ultrasound only in the air or in this case the based on the losses in the sound cavity. The electrical coupling of ultra sound resonator is in this case made by growing to the holes made by RIE etching a conducting pillar of polysilicon. Before growing the pillar the silicon walls are oxidized. The sound cavity can be made by growing on top of silicon polysilicon, silicon nitride, or amorphous metal. The cavity can be made for example by RIE etching, which stops to the upper membrane. The discs can be taken together by fusion bonding. In the end the disk is cutted to pieces for example by sawing. The breathing hole can be made either to the upper membrane, downer surface of the sound cavity or to the upper membrane of the ultrasound transmitter. The size of the breathing hole determines the downer limit frequency and has to be very low especially in microphones. In fast gas sensors it should be high enough in order to get fast response time.

FIG. 6a presents electrical circuit equivalent of the ultrasound sensor 25 in accordance with the invention. The coil 63 corresponds to mass of the membrane 59 and capacitance 64 to its spring constant and capacitance 60 to its electrical capacitance. Resistance 62 corresponds to losses of the membrane 59 and resistance 61 to radiation loss. The component values are also depending on the voltage over the ultrasound sensor. If the sound cavity is for example λ/2 long, it makes the resonance of the ultrasound stronger. The sound wave arrives at ultrasound membrane in a stage that adds motion of the membrane. Circuit 20 represents an antenna including a voltage generator 150 and a serial impedance 151. Conductors 152 are connected to the electrical connections of the sensor 25, typically in practice to the electrodes 12 and 13 of FIG. 3.

FIG. 6b presents electrical circuit equivalent with the cavity 54, when the cavity is λ/2 long meaning in other words that the cavity is forming a serial resonance. It should be noted that the cavity can also be a quarter of a wavelength long or a multiple of it. The impedance of the cavity 64 replaces the radiation resonance in the FIG. 6a. The impedance of the cavity 64, thus, is formed by effective coil 65 of the resonator 54, effective capacitance 66 and resonator loss 67. We note that the system forms one new serial resonance. We can think that the resonances degenerate to one resonance. If now the effective capacitance 66 formed by the cavity 64 is smaller than the effective capacitance 64 of the ultrasound transmitter 52 and if the inductance 65 of the cavity 54 is greater than the inductance 63 of the ultrasound sensor, the impedance of the sensor 51 (=transmitter 52+cavity 54) is determined solely by the cavity 54. In practice the situation is not this ideal. Furthermore we assume that the internal losses of the ultrasound transmitter 52 are smaller than the losses generated by the cavity 54. This can be achieved if we use micromechanical transmitter 52.

The optimization has a requirement that the mass and spring constant (strain or stiffness) of the ultra sound transmitter's vibrating membrane 59 should be minimized in a way to achieve the wanted frequency of resonance. In addition the area of the membrane should be dimensioned in a way to maximize or to optimize the coupling to the gas. The optimal dimensions depend whether the membrane vibrates in a piston mode or in a flexible mode. In addition the shape of the transmitter 52 affects. The membrane 59 can be formed from many small individual ultrasound membranes 59. This situation is presented in the FIG. 5*b*. In general the radiation optimal is achieved when the thickness of the membrane is about at the magnitude of a wavelength of the used ultrasound frequency. In other words the natural dimensions of the cavity 59 are the width $\lambda/2$ or $\lambda$ and also the length or height $\lambda/2$ or $\lambda$. The width can be also greater if we make the transmitter of many different elements. The position of the upper membrane 59 changes the phase of the impedance or in other words its imaginary part. The losses of the cavity 54 change the real part of the impedance. In other words by measuring a phase sensitive sensor the value of the imaginary part, we can figure out the alteration or deflection of the membrane 59. Fundamentally the sensor 51 measures the place or change of the place, but it can be used for measuring several different variables. Afterwards we will call this sensor 25 also as UltraMEMS.

The Q factor of the resonator can be even very large, because the Q factor of the sound cavity 54 is dominating. The Q factor can be even 4000.

Wireless MEMS sensor and a method according to the invention.

The wireless MEMS sensor is based on the fact that the force is following square-law in relation to the voltage between the MEMS electrodes. Feeding in two frequencies $f_1$ and $f_2$ to the MEMS generates a force having a frequency of differential frequency $f_3$ of the signals=$|f_1-f_2|$. If this frequency is same as the frequency of the ultrasound resonator, the membrane is vibrating effectively in this frequency and generates modulation to the both base frequencies. In other words by fixing one of the sent frequencies $f_1$ and $f_2$ and by adjusting the other, the place of the resonance, and also the Q factor if needed, can be found out. Because the Q factor is very large it separates very well from the background. The information rate of the sensor is the resonance frequency divided by the Q factor, thus making it beneficial to use a high resonance frequency.

1. Wireless UltraMEMS

By combining the UltraMEMS and the wireless reading of MEMS sensor we can make a battery free sensor where variable is changing/altering the place of the membrane and in that way the frequency of resonance. By measuring the frequency simply by adjusting the frequency difference of two signals, we can wirelessly measure the examined variable. Naturally we can also measure attenuation of gas.

2. Reading Electronics

In accordance with FIG. 7*a* the reading device 70 generates by generators 711 and 712 two frequencies $f_1$ and $f_2$, whose frequency difference of which can be adjusted to a resonance frequency of the sensor 25. The generated signals are isolated by isolators 721 and 722 and combined by a power combiner 73. From the power combiner the signals are fed to a circulator 74, which sends them to an antenna 160. Antenna 160 transmits frequencies $f_1$ and $f_2$ and the antenna 20 of the sensor 25 backscatters a third frequency $f_3$, the frequency of which is dependent on the properties of the sensor 25, especially on the properties of the ultrasound cavity 54. Frequency $f_3$ reflects or backscatters to the antenna 160 of the reading device 70, where it is led e.g. via circulator 74 and a possibly via attenuator 75 to a spectrum analyzer 76 or similar device for determining the frequency $f_3$.

In accordance with FIG. 7*b* the attenuator 75 and spectrum analyzer 76 may be replaced by a 90 degree hybrid 180, the output of which is multiplied by multipliers 181 getting their inputs from multiplier 183, which has as an input frequencies $2*f_1$ (from frequency doubler 182) and $f_2$ directly from signal generator 712. As an output from 1 and Q branches is received frequency $f_3$ in vector format including both frequency and phase information.

The measurement is complicated because it necessitates very low receiver distortion. In principle this can be eliminated by electrical filters or by active carrier compensation.

FIG. 8 presents a way how to manufacture a component according to the invention. Ultrasound transmitter 52 is based on SOI disc 83, the silicon oxide structure of which is locally sacrificed through holes 81 made by RIE etching in order to form a cavity 52 of the ultrasound transmitter. An alternating voltage is formed between electrodes 12 and 59 in order to generate an ultrasound signal.

The structure of FIG. 8 can be made in many ways. For example an ultrasound transmitter 52 can be made by growing on the top of silicon and silicon oxide a polysilicon membrane and after that etching polysilicon away from a certain area through the holes 81 made to the polysilicon membrane 59. This enables manufacturing a low mass ultrasound transmitter enabling easier determination of the effective losses of the whole structure by the cavity. On the other hand the ultra sound sensor may be formed out of several for example hexagonal transmitters, which enables us to adjust an appropriate operating frequency by the size of individual element and by the amount the area of the cavity. This type of structure is beneficial also because of the fact that it enables a structure having high frequency and wide cavity and through this the upper membrane is not so easily radiating the ultrasound away through the membrane of the cavity weakening the resolution.

FIG. 9 presents a sensor, wherein ultrasound cavity 54 is formed by bonding two SOI discs 83 and 90 together. A cavity 54 is formed by etching cavity 54 to the upper SOI disc 90. This cover silicon is then grinded and included thinning grooves 91 in order to enable piston mode movement of the membrane 53. Thus in the upper SOI disc the upper silicon 53 is forming moving measurement membrane and the downer 82 gas cavity 54.

FIG. 10 presents an acceleration or shake sensor 51 having large resolution and dynamics. In the solution the surface 53' below the mass 102 operate as a primary sensor element. The closed structure prevents the humidity to affect to the acceleration sensor and the upper inflexible membrane reflects the power back to the cavity 54 increasing sensitivity of the sensor. The sensor is not sensitive to pressure changes. By using several ultrasound transmitters and patterning the mass 102 suitably, we can also measure the lateral movements, i.e. make an acceleration sensor to x and y directions. In this case it is beneficial that the upper cavity is a quarter of a wavelength long. We call this sensor as UltraVib.

FIG. 11 presents possible antenna configurations for a wireless ultra MEMS sensor 25 according to the invention. A wireless ultra MEMS sensor 25 is realized by matching an antenna 20 or near-field coupling element to the ultra MEMS sensor 30. The antenna or coupling element should be selected according to the carrier frequency, allowed antenna volume and weight, signal bandwidth, desired read-out distance and electrical impedance of the ultra MEMS sensor element 25. In the following, we give examples of two possible antenna structures, although other structures can be used equally well.

The ultra MEMS sensor 25 utilizes a capacitive transducer and therefore has capacitive input impedance. An electrically small loop antenna 20, on the contrary, has inherently inductive impedance and is therefore straightforward to conjugate match to the ultra MEMS. The loop antenna 120 could consist of a circular conductor directly connected to the ultra MEMS sensor, as shown in the FIG. 11. The loop dimensions should be selected such, that its input series resistance is equal to that of the ultra MEMS sensor 25 and that its series inductance is $L=1/((2\pi f)^2 C)$ where f is the carrier frequency and C is the series capacitance of the ultra MEMS sensor 25.

When lower read-out distance of the sensor is sufficient, a near-field coupling element can be used instead of an antenna. Inductive coupling between the reader and sensor is typically realized by equipping the reader and the sensor with coils. The current in one coil 20 then induces current to the reader coil or antenna 112, as shown in the FIG. 12. The coil diameter must be much less than the wavelength at the carrier frequency and the read-out distance is typically in the order of coil diameter. The matching circuit 113 can be integrated into the reader device 70 when using the near-field coupling between the reader 70 and the sensor 30.

3. Applications

The sensor is fundamentally measuring a place or a change in a place. Because of this it can used in all the applications where sensitive measuring of the place of a surface is essential. In other words the UltraSensor can be used for making a microphone, a pressure sensor, acceleration sensor or a magnetometer. In addition the device can be used for measuring the speed of sound or gas attenuation, i.e. it can be used as a gas sensor. If the cavity is a quarter of a wavelength long and it is filled with a gas heavier than the air, it forms a impedance transformer between the MEMS ultrasound transmitter or receiver and the air. In the following special characteristics of different sensors are presented.

3.1. Place Sensor.

UltraSensor as such is a sensor measuring place, speed or acceleration. Typically acoustic emission is measured by coupling a piezoactive structure on the surface of a metal to detect acoustic waves. In this application the UltraSensor as such can be used to replace the piezo sensors. The benefit of the ultra sensor is a smaller size, price, and possibility to integrate many receivers to a single silicon platform. On other hand the upper structure can be made to include a structure changing the amplitude of motion and bringing in "mechanical" strengthening to the sensor.

3.2 Impedance Matched Broadband Ultrasound Transmitter and Receiver

If we make a cavity of quarter wavelength and fill it with appropriate gas mix (for example argon, carbon dioxide, nitrogen, . . . ) we can adjust the density of the gas in a way that the characteristic impedance of the micromechanical sensor matches well to the air. This happens in practice if the density of the gas in the cavity is about ten times greater than the density of the air. Because the electronics can be taken far from the object to be measured, it makes it possible to measure in difficult conditions (for example a temperature of 300 centigrade). The radiation efficiency ratio from MEMS source to the air is reasonably good, from 1% to 3%, compared for example to a piezoactive chip. Piezoactive plastics are almost as good as MEMS. By adding a gas transformer according to this invention the efficiency ratio can be increased to clearly over 10% and in this way significantly improve the signal to noise ratio. This achievement enables wireless solutions.

3.3 The sensor can measure both the sound velocity and attenuation in gas. Knowing those characteristics make it possible to conclude the gas in examination. Of course the sound velocity and attenuation are also dependent on the temperature and the humidity. This means that in order to have a precise measurement the variables mentioned need also to be measured. In the case of gas sensor the resolution of the sensor is not the bottleneck, but the essential errors are formed by mechanical tension, temperature compensation and such things. It is of course essential to note that the sensor do not provide unambiguous information about the composition of the gas. If, however, it is possible for us to use the sensor also in higher frequencies, we can get more information about the composition of the gas by knowing the changes in the sound velocity and attenuation. It is generally known that by measuring both sound velocity and attenuation in a very large range of frequencies for example the humidity of the air can be separately determined.

A wireless gas sensor is beneficial in a situation where a high temperature or other reason prevents installing the sensor electronics and cabling near to the object to be measured.

3.4 Humidity Sensor

Because the sound velocity is mainly dependent on the temperature it can be used as a reference when measuring the other variables. On the other hand the sound attenuation is monotonically dependent on the moisture in ultrasound frequencies higher than 200 kHz. This leads to the fact that by measuring the attenuation the humidity of the gas can be determined. In the precise measurements also the pressure should be measured, because the increase in the pressure makes the loss smaller. Also the pressure can be measured by a UltraMEMS sensor. UltraMEMS provides very good humidity sensor, because typically the humidity sensors are based on rigid material, such as oxide and plastic, they are having high hysteresis and bad stability, because the chemicals affect. This kind of problems does not exist, because the UltraMEMS is measuring humidity directly from the gas phase.

3.5 Pressure Sensor

If the sensor is used for measuring the pressure the cavity should be filled with a known gas, preferably having small attenuation to sound and causing low effective capacitance and high inductance. Of course the gas need to also be selected in a way that it is not easily reacting with silicon or silicon oxide and that it is not easily diffusing away from the cavity. The problem with the current MEMS pressure sensors is that the spring coefficient needs to be dimensioned in a way that the maximum pressure does not cause too large alteration of the membrane. The height of the cavity must be kept low in order to make the measurement of the capacitance with low voltage and at the same time to have an adequate resolution. Ultra sensor is not having the same problem. By dimensioning the membrane loose we can get the device less sensitive for example to the torque of the platform. A downside is that the effective spring constant of the Ultrasensor is somewhat dependent on pressure according to the following formula.

$$k = k_m + \frac{pA}{h}$$

In the formula h is the height of the cavity, p is pressure and A is the cross sectional area of the cavity. By placing typical values to the equation we note that when the height is 100 um or more the mechanical spring constant essentially determines the effective spring constant. Thus the pressure dependence is not causing an essential problem.

The great dynamics of UltraSensor differentiates it essentially from the current capacitive MEMS sensors, where the distance of the electrodes from each other is only couple of micrometers. Such structure causes so called capacitive nonlinearity, of course somewhat compensatable by back coupling. However back coupling often requires high DC voltage, which is difficult to produce and causes accumulation of charge to surfaces and thus instability.

Maybe the clearest wireless pressure sensor application is a tyre pressure application for cars and other vehicles.

3.6. Current Meter, Magnetometer, Power Meter

Outside magnetic field generated by DC current or permanent magnet generates a force, which can be expressed wirelessly by UltraMEMS. If a voltage causes with use of resistance an internal magnetic field and current causes an external magnetic field, we can have a measurement of the power in the conductor. Wireless UltraMEMS can enable monitoring high voltage grid features wirelessly for example by a reading device installed to a pole for electrical wires.

3.7. Acceleration and Shake Sensor

If the structure "breaths" enough and the mass of the higher membrane is made big, we can make an acceleration sensor by the method. With the spring constant and mass we can adjust the sensitivity and upper limit frequency of the sensor. Because the spring constant can be very loose we can make a much more sensitive sensor than the current acceleration sensors. The sensitivity can be calculated from the equation in this document. The motion is determined by equation kx=ma, where a is acceleration. The attenuation (caused by/of) the upper membrane can be adjusted by holes in the upper membrane. Typically the acceleration sensor is dimensioned overly attenuated. Meaning that in a wireless application the response to low frequency acceleration would be good to attenuate in a way that the resonance of the voice cavity would not be significantly attenuated. If a moving mass has holes of appropriate size, the attenuation for small frequency signal is increased, but the Q factor of the sound resonator do not change significantly.

Maybe the most interesting application for this would be in measurements in well being applications (such as human movements, following the movements of elderly people) or in implants, because the technology do not even require a battery.

3.8 Microphone, Ultrasound Sensor, Sound and Ultrasound Transmitter

A microphone and an ultrasound sensor are functioning in a same way as the above presented wireless sensors. In sound frequency area we have to make a microphone in a way that it is resonance free in the area from 10 Hz to 20 kHz and is having resonance at an appropriate frequency above that, such as at 100 kHz. The ultrasound sensor can function in a same way, but in this area we can also make a narrow band ultrasound sensor, i.e. we will activate it to electrically vibrate in this frequency directly and the pressure wave targeting to this cause an interference, which is detected through intermodulation. This broadens the utilization of ultrasound to applications having benefit from combining the wireless and the ultrasound. In a way this is a wireless bat.

3.9. Measuring Potential

If voltage is transformed to change of position for example by making the upper membrane of two pieces, the downer one of which is allowed to move with help of a low frequency voltage, we are able to measure voltage wirelessly, for example the electrical field generated by our heart or brain. To increase sensitivity we need to put a dc voltage over the membrane. Hence we need to rectify the frequency from the vibration of the membrane.

3.10. General Applications

On its best UltraMEMS is applicable for medical science, well being, vehicles, construction or to industry. There are of course other applications where wirelessness is very important. The idea makes many applications possible which are not here mentioned.

3.11 Medical Science

In the medical science the sensors can be applied by putting sensors to surface of the skin or by implanting sensors inside the body. For the sensors to put inside the body the greatest challenge is how to integrate the sensor inside the body. Here described technique enable very high base frequency making it possible to put sensors very close to the skin enabling transmitting the power from the belt or wrist computer to the target. Deep in the body there can be solely the UltraMEMS, sensor requiring only the resonance structure. If the source is close we can make the energy transfer by so called near field, sensor including only a tuned coil. Made in this way the sensor could be integrated with antenna in magnitude of 1 mm, for example in a situation where the bracelet is very close to the target. The most obvious application is real time monitoring of the blood pressure. This of course also provides the pulse of heart. By the pressure difference also stream can be measured. Ultrasound can be applied both or either or inside and outside the body. It is not out of question to make body internal ultrasound information transfer system (network of sensors) wirelessly coupling outside the body utilizing the technique according to the invention. The principle could enable measuring chemical biological variables.

3.12. Well being Sensors

In many athletic events heart beat, operation of the lungs, and generally variables caused by human movement. Techniques according to the invention are well applicable in gyms, or sensors required in relation to human movement. These techniques also enable real time monitoring of elderly and sick people. What make these techniques beneficial is freedom from batteries and relatively low cost because of simple structure enabling sensors for one time solutions. Also integrating to clothes is possible. For example alteration of carbon dioxide through breathing messages the vital capacity of the lungs and in general breathing, which is important for snoring patients, who can die when they sleep.

3.13. Construction

For buildings bridges, and roads tensions, temperatures and such are to be measured. Humidity can be measured by UltraMEMS by measuring both displacement of the resonance and Q factor, which both are dependent on the air humidity. The tension can be transformed through motion of upper membrane of UltraMEMS to a change in resonance frequency. Mould generation could maybe be (detected/prevented) by an appropriate UltraMEMS coating.

3.14. Vehicles

The clearest vehicle application is tyre pressure. By installing a tyre pressure sensor to vent and a reading device for example to the front mirrors, the antenna is targetable in a way to point the field mainly to the tyres only. The sensor in vent can measure shaking, which is caused by loose bolts or friction alteration between the tyre and the road. In the airplanes many variables are measured. For example from the wings a high frequency sound caused by the structure breaking down could be monitored in order to forecast a potential fault situation.

3.15. Industry

Many variables of the devices in the industry are interesting to be measured and known. Those are for example variables related to the condition of the device, shaking, acoustic emission, temperature, gas leaks, humidity and so on. If the conditions for the target are difficult, such as high temperature, corrosive gasses, MEMS is a good alternative because it requires only an metallic antenna (can be protected for example by oxide) and a simple structure made of silicon. Generating and listening to the ultrasound could enable also measuring the speed of stream of gas or liquid.

In the industrial logistics the sensor could be used as a way to measure leakage in a package, shaking or temperature (permanent change in MEMS), deterioration and so on.

3.16. Other Applications

Wireless magnetometer and power meter could have applications. The technique according to the invention enables a possibility to make a wireless ultrasound sensor and transmitter. Also a wireless microphone and loudspeaker are possible. These could be used for example in connection with mobile computers and phones. Magnetometer can be used for example in the coming fusion power plants, stream measuring and/or power measuring to wireless measuring conductors in high voltage grids.

4. Operating Voltage

If the application requires DC voltage we can do it by adding after MEMS a diode, which rectifies the operating voltage from voltage difference vibration. It should be noted that the diode can be slow, because the voltage difference usually is from 1 kHz to 10 MHz. Generating the operating voltage broadens the applications of UltraMEMS.

5. Coding

Often sensors are close to each other. Different sensors can be differentiated from each other by giving them different frequencies of resonance. Because the Q value can be high, we can have even 1000 sensors to the same field. If in addition the carrier frequency is high we can target the reading device just to the sensors we want. The problem of course is that the sensors should be selected to different targets in a way that the frequencies do not accidentally overlap.

If we put a slow diode to the system, we can get operating voltage for a simple CMOS circuit. The circuit can operate in a way that the reading device asks only one circuit to operate. The circuit decodes the carrier modulation which is transformed to a slow frequency signal by a diode. When the code corresponds to the internal code of the CMOS circuit, the device transfers the resonance frequency to different location by DC voltage or modulates by AC voltage the force targeting to MEMS. In the latter the reading device detects only one circuit, which appears at the receiver as modulation of modulation. The coding can be made of RFID type in a way that MEMS or other nonlinear circuit transfers the high frequency signals to low frequency signals (HF (13.56) or UHF (ca. 900 Mhz). By modulating high frequency signal we can artificially generate a RFID compatible signal enabling using anticollision of RFID. The sensor information can be read at the same time with the resonance frequency, but modulation generated by only one RFID differentiates the sensor from other sensors.

In accordance with the invention a wireless sensor unit may have several ultrasound sensor units 30, 31 connected to the same antenna 20 with slightly different basic resonance frequencies caused by three mechanically different cavities 54. Based on these differences there will be three different backscattering frequencies $f_3, f_3', f_3''$.

Based on these three frequencies $f_3, f_3', f_3''$ these units will have individual identities and therefore one reading device 70 may illuminate several sensors and keep track on from which sensor the signal is received. This identification may be performed also by connecting to the ultrasound sensor 25 to a RFID-tag giving identity to an individual ultrasound sensor.

The invention claimed is:

1. A wireless sensor comprising;
an electrostatically actuated ultrasound transmitter loaded with a fluid-filled cavity and comprising a light-construction diaphragm oscillator,
a passive sensor element located at the opposite end of the cavity to the ultrasound transmitter,
an antenna matched to the ultrasound transmitter, the antenna being configured to receive radio frequency signals (f1, f2), and
a conductor arrangement connecting the antenna to the ultrasound transmitter for using the radio frequency signals for providing energy for driving the ultrasound transmitter,
wherein the antenna for receiving radio frequency signals (f1, f2) fed by a reader device is configured for sending radio frequency signals (f3) based on the interaction between the ultrasound transmitter and the cavity and the ultrasound transmitter is configured to actuate at the frequency difference of an incoming signal.

2. A sensor in accordance with claim 1, wherein the antenna is a loop antenna.

3. A sensor in accordance with claim 1, wherein the antenna is a dipole antenna.

4. A sensor in accordance with claim 1, wherein the light-construction diaphragm oscillator forms one electrode of the transmitter and a fixed electrode forms another electrode for the ultrasound transmitter and wherein the antenna is electrically connected to said electrodes.

5. A sensor in accordance with claim 4, wherein the ultrasound transmitter of the antenna is electrically connected to said electrodes through a matching circuit.

6. A sensor in accordance with claim 1, wherein the distance of the passive sensor element from the ultrasound transmitter is such that a resonance condition is met.

7. A system for measuring pressure, sound pressure variation, magnetic field, acceleration, shaking, or gas composition, comprising;
at least one ultrasonic sensor having a cavity, an ultrasound transmitter and a passive sensor element sensitive to a parameter to be measured,
a reading device capable of reading a variation in the sensor caused by a change in the parameter to be measured, wherein the sensor includes at least one antenna for wireless communication with the reading device, and wherein the reading device is configured to
- generate two frequencies and sending them to the at least one sensor, and
- detect a third frequency backscattered or reflected from the sensor and wherein the ultrasound transmitter is configured to actuate at the frequency difference of an incoming signal.

8. A system in accordance with claim 7, wherein at least one of the antennas is a loop antenna.

9. A system in accordance with claim 7, wherein at least one of the antennas is a dipole antenna.

10. A system in accordance with claim 7, wherein in the sensor has a light-construction diaphragm oscillator forming one electrode of the transmitter, and a fixed electrode forms another electrode for the ultrasound transmitter whereby the antenna is electrically connected to said electrodes.

11. A system in accordance with claim 10, wherein in the sensor the ultrasound transmitter of the antenna is electrically connected to said electrodes through an matching circuit.

12. A system in accordance with claim 7, wherein the ultrasound transmitter of the sensor is formed by a piezo element.

13. A system in accordance with claim 7, wherein at least one sensor includes several cavities with different basic frequencies connected to the same antenna in order to give an identity for the sensor unit.

14. A method in connection with an ultrasound sensor, the method comprising:
- forming ultrasound in an electrostatically actuated ultrasound transmitter loaded with a fluid-filled cavity,
- matching an antenna or a near-field coupling element to the ultrasound transmitter,
- adapting a reader device to feed two frequencies (f1 and f2) to the ultrasound sensor, whereby the ultrasound transmitter actuates at the frequency difference of an incoming signal, and wherein the ultrasound sensor backscatters signals at an intermodulation frequency (f3) of two actuation frequencies (f1 and f2), and
- using the intermodulation response (f3) of the ultrasound sensor to measure the dimensions of the fluid-filled cavity that is used to load the ultrasound transmitter or the propagation properties of sound in the fluid, whereby external measured quantity affects either the dimensions of the cavity, the propagation properties of sound in the cavity or both.

15. The method of claim 14, wherein the reader device is inductively coupled to the ultrasound transmitter via a first coil connected to the reader device and a second coil connected to the ultrasound transmitter.

* * * * *